Dec. 4, 1962  F. B. RYAN  3,066,491
HAND-OPERATED WIRE AND CABLE LAYER
Filed Oct. 20, 1960

INVENTOR
FRANCIS B. RYAN
BY Cameron, Kerkam & Sutton
ATTORNEYS

United States Patent Office 3,066,491
Patented Dec. 4, 1962

3,066,491
HAND-OPERATED WIRE AND CABLE LAYER
Francis B. Ryan, Chariton, Iowa
Filed Oct. 20, 1960, Ser. No. 63,861
4 Claims. (Cl. 61—72.6)

This invention relates to an improved wire and cable layer specifically designed for use in small installations, particularly lawns and parks and in constricted spaces where larger machines cannot operate.

This machine is designed to be operated by one individual, appropriate traction being applied to the implement from a small tractor or other powered vehicle to which it is attached by means of a towing hitch provided at the forward extremity of the main frame of the machine.

The machine comprises a main frame, provided at its forward extremity with a towing hitch and at the same extremity with a pair of wheels mounted on a laterally disposed axle fixed across the forward extremity of the main frame. The wheels are equally spaced at each side of the forward end of the frame to provide stability to the cable layer during the ditching and cable laying operation. Disposed at one side of the forward extremity of the main frame is a coulter wheel which makes a preliminary cut in the surface of the ground to assist the ditching blade in its penetrating and cable laying operation. The main ditching and cable laying blade is aligned behind the coulter in the same vertical plane.

The cable laying blade is disposed in a vertical plane at the rear extremity of the main frame and as aforesaid its forward cutting edge is aligned with the coulter blade. The ditching blade is preferably mounted on the side of the main frame by means of a pair of bolts fitting through bores in the head portion of the blade registering with aligned bores in the main frame. A set of auxiliary bores is also provided whereby the length of the blade and its depth of penetration may be regulated, as desired. The forward or cutting edge of the blade is of unique and novel configuration, as will be discussed further.

A cable tube is provided disposed along the rear edge of the blade and novel force feed means are also provided to assist in the proper feeding and laying of the cable.

At the rear extremity of the frame there are provided angularly disposed arms which extend upwardly and rearwardly therefrom for the use of the operator in controlling the direction and depth of operation of the apparatus. A foot rest is also provided for this purpose.

It is therefore a primary object of this invention to evolve a comparatively light and easily handled machine for the laying of cable or wire at a relatively shallow depth beneath the surface of the ground.

It is a further object of this invention to provide such a structure in which the cut in the ground is of comparatively small width and damage to the surface being traversed is reduced to a minimum.

It is another object of this invention to provide traction means on the main frame of the apparatus aligned with the coulter wheel and the ditching blade whereby the pulling of the blade through the ground may be effected with a minimum expenditure of effort.

Another object is to provide novel force feed means at the head of the cable tube to assure proper feed and laying of the cable.

It is a further object of this invention to evolve such a structure which may readily be handled and controlled by one man and which will effectively lay a cable at the desired depth for any desired distance.

Other and further objects of this invention will become apparent as this specification proceeds.

Referring to the drawings, FIG. 1 is a top plan view, partially in phantom, of a cable laying machine in accordance with this invention;

Figure 1:
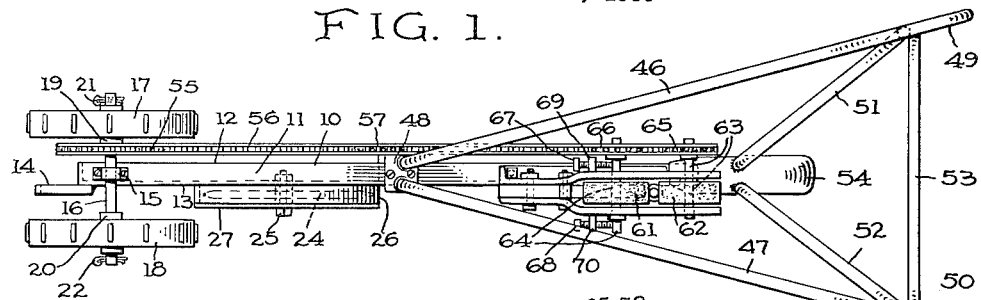

In the drawings, 10 indicates the main frame of the machine which is preferably formed of a steel channel with a flattened top surface 11 and depending parallel side walls 12 and 13.

As its forward extremity frame 10 is provided with a towing hitch 14 which is preferably welded, bolted or otherwise affixed to one side of said frame and extends forwardly therefrom. Hitch 14, as shown, is preferably disposed to one side of the forward extremity of frame 10 so as to be aligned longitudinally with the coulter blade and the main ditching blade, as will hereinafter be discussed at more length.

Figure 2:
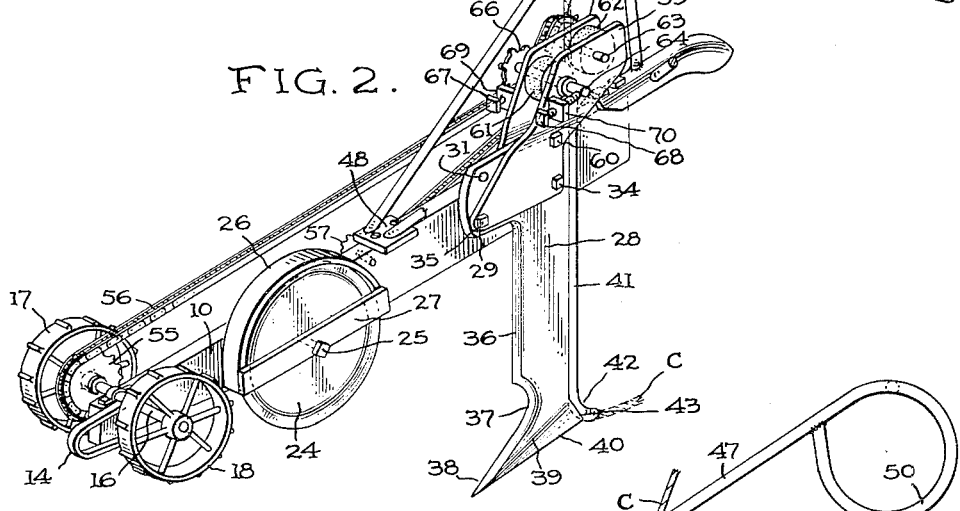
FIG. 2 is a perspective view taken from the left front, partially broken away and in phantom, of the cable laying machine in operating position with the blade set to the desired depth beneath the surface of the ground and showing the cable being laid in the cut made by the blade.
Figure 3:
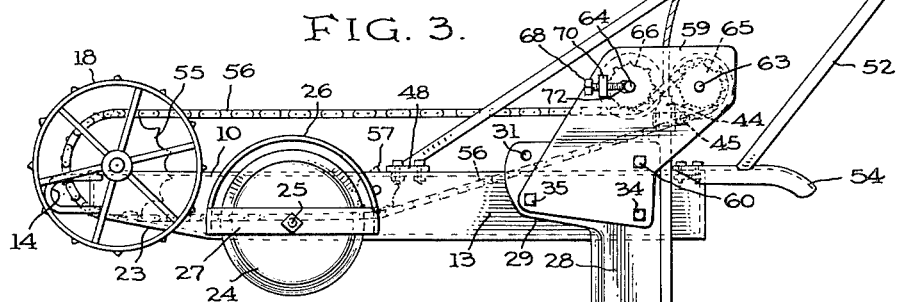
FIG. 3 is a side view of the structure, partially in phantom.
Figure 4:
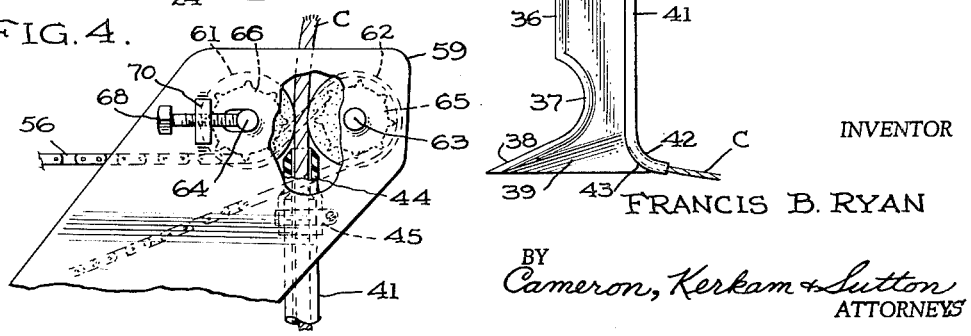
FIG. 4 is a fragmentary detailed side view, partially broken away and in phantom, of the force feed roller structure positioned above the cable tube.

Mounted across the top of frame 10 as by a suitable bracket 15 is axle 16, rectangularly disposed thereto and positioned just rearwardly of the forward extremity of the frame 10. Wheels 17 and 18 are rotatably mounted on the lateral extremities of axle 16 by means of suitable bearings 19 and 20. Cotter pins 21 and 22 are provided through bores in the extremities of axle 16 to maintain wheels 17 and 18 in position thereon. As shown in FIG. 2, wheels 17 and 18 are so mounted at the forward extremity of frame 10 that their lower peripheries extend downwardly a slight distance below the forward undersurface of frame 10 which, as shown, is upwardly inclined to the forward extremity of frame 10, at 23, to provide a reduced depth thereto, for a purpose hereinafter to be discussed in more detail. Wheels 17 and 18 are disposed in parallel vertical planes and are equally spaced on each side of frame 10.

Rotatably affixed to one side of frame 10, rearwardly of wheels 17 and 18, is a circular coulter wheel 24 which is sharpened about its periphery and is rotatably mounted at its center to side wall 13 of frame 10 by means of a bolt 25. As shown, coulter wheel 24 is so mounted on side wall 13 of frame 10 that it extends downwardly below the lower edge of frame 10 a substantial distance. It will also be noted that coulter wheel 24 extends downwardly a substantial distance below the lower peripheries of wheels 17 and 18.

Coulter wheel 24 is preferably provided about its upper periphery with a semicircular guard or housing 26, supported thereover by means of bar 27 through which bolt 25 is fitted. Housing 26 is affixed to side wall 13 of frame 10 at its lower, inner extremities, as by welding. Coulter blade 24 is rotatably mounted at its center on bolt 25 whereby it will rotate and make a rectilinear cut in the surface of the ground of considerable depth as the machine is pulled in a forward direction by traction on hitch 14, to provide an entry cut for the upper section of the main ditching blade and to ease its passage through the ground.

Ditching blade 28 is bolted or otherwise adjustably affixed at its upper extremity to side wall 13 of frame 10, at the rear extremity thereof. As shown, blade 28 is provided with an enlarged, flattened upper extremity 29 which fits flush against side wall 13 of frame 10 to maintain blade 28 in vertical position depending downwardly beneath frame 10. As shown, two sets of bolt holes 30 and 31 are provided in flattened head extremity 29 of blade 28, registering with corresponding pairs of holes 32 and 33 in side wall 13 of frame 10 whereby the depth of cut of blade 28 may be readily adjusted, as desired. Additional pairs of bolt holes may be provided in head 29 of blade 28 for more refined adjustment of the depth of cut thereof. Appropriate bolts 34 and 35 are provided to fit through bolt holes 30 or 31 and corresponding holes 32 and 33 in side wall 13 to maintain blade 28 in vertical position on frame 10.

Blade 28 is provided with a sharpened upper forward edge 36 at its upper forward extremity beneath which is provided an arcuate blade section 37 which is inwardly curved and extends into blade 28 inwardly of upper cutting edge 36. This arcuate lower blade section 37 is provided to increase ease of penetration of the lower portion of the blade by means of a quasi "sawing" action toward the foot of the blade and also makes for ease of penetration of the lower end of the blade above the shoe. Further, by its inner curvature into the blade body it tends to reduce friction and resistance to passage of the blade through compacted and dense earth, at this point. It further acts to ease the penetration of the lower shoe or plow of the blade by its "sawing" action.

Arcuate blade section 37 at its lower extremity extends smoothly into sharpened toe 38 of base plow 39 of blade 28 which is preferably welded to the lower extremity of blade 28 and extends forwardly an appreciable distance therefrom. Plow 39 is preferably downwardly widened and of substantially triangular cross-section and is provided with a flattened lower surface 40.

Cable tube 41, of a diameter substantially equal to the thickness of blade 28, is arc welded down the rear, flattened surface of blade 28, extending downwardly therealong and is rearwardly curved at its lower extremity at 42 where it is fitted to the curved heel or rear extremity 43 of plow 39. Cable tube 41 is preferably formed of stainless steel and is lined with a plastic to protect the cable. At its upper extremity cable tube 41 is provided with a short plastic entry neck 44 which is flexible and is affixed over the upper extremity of cable tube 41 by means of a clamp ring 45.

Extending upwardly and rearwardly from the midsection of upper surface 11 of frame 10 are handle members 46 and 47 which, as shown, are angularly disposed with respect to each other at an acute angle and are appropriately welded at their forward extremities to a plate 48 which is preferably bolted to the upper surface 11 of frame 10, rearwardly of coulter blade 24. Handles 46 and 47 are preferably formed of steel pipe and are brought about at their upper extremities into circular hand sections 49 and 50 for the manual grip of the operator. At their rear extremities handles 46 and 47 are provided with brace members 51 and 52 and lateral brace 53, welded therebetween. At their lower extremities braces 51 and 52 are welded to foot rest 54 which is, as shown, a flattened, downwardly curved metal piece bolted or otherwise affixed at its forward extremity to the upper surface of the rear extremity of frame 10 and extends rearwardly therefrom. Foot rest or step 54 is designed to receive the foot of the operator to assist in initial penetration of coulter blade 24 and blade 28 into the ground. It may also be used by the operator to maintain the frame 10 parallel to the ground during operation and to maintain blade 28 at the proper depth in the ground during the cable laying operation. In the event that blade 28 should tend to pull up out of the ground the operator may apply his foot and weight on foot rest 54 and arms 46 and 47 to return it to proper depth and maintain it there.

Cable C is shown, passed between handles 46 and 47, over brace 53 into plastic collar 44 of cable tube 41 and thence passing down through cable tube 41 and out at its lower curved extremity 42 whence it is laid in the bottom of the cut formed in the ground by blade 28. As previously indicated, tube 41 is preferably formed of steel, lined with plastic to protect the cable being laid. Entry collar 44 is formed of flexible plastic to guide the cable into cable tube 41 without damage and to prevent binding or kinking of the cable C at the upper entry point into cable tube 41.

As cable tube 41 is disposed down the trailing edge of blade 28, as blade 28 is pulled through the ground by the traction means attached to towing hitch 14 at the forward extremity of frame 10, cable C will be pulled downwardly through cable tube 41 and will thus be laid in the bottom of the cut formed by blade 28, when force feed means for the cable are not provided.

Force feed means for feeding cable C into entry neck 44 of cable tube 41 and to force cable C downwardly therethrough are shown. These force feed means are comprised as follows: Affixed to the inner surface of hub 19 of forward right-hand wheel 17 is a toothed sprocket 55 so mounted on the inner hub of wheel 17 as to rotate therewith as the machine is pulled forwardly by traction on towing hitch 14. Passing over sprocket 55 is a sprocket drive chain 56 which extends rearwardly the length of frame 10 laterally thereof. An idler sprocket 57 is rotatably mounted on side wall 12 of frame 10 rearwardly of coulter blade 24 and receives the lower segment of sprocket chain 56 which passes thereunder.

At the rear extremity of frame 10 and extending upwardly therefrom above ditching blade 28 and cable tube 41 are paired plates 58 and 59 which extend upwardly in spaced, parallel relationship with each other an appreciable distance above the head section 29 of blade 28. As shown, plates 58 and 59 are preferably bolted over the rear extremity of frame 10 by means of blade bolts 34 and 35 of blade 28 and an additional bolt 60 provided through appropriate bores in plates 58 and 59. Thus it will be seen that bolts 34 and 35 not only serve to maintain blade 28 in position on frame 10 but also to maintain plates 58 and 59 in parallel, spaced relationship above blade 28 and the rear extremity of frame 10.

Rotatably mounted between the upper extremities of plates 58 and 59 are force feed rollers 61 and 62, appropriately mounted on axles 64 and 63 which are rotatably mounted in aligned bores in plates 58 and 59. At their outer extremities, axles 63 and 64 are provided with small drive sprockets 65 and 66, sprocket chain 56 passing under drive sprocket 66 and thence upwardly, over and around drive sprocket 65 from whence sprocket chain 56 passes downwardly under idler sprocket 57 and thence under and back over main drive sprocket 55 which, as aforesaid, rotates with forward wheel 17 of the machine.

It will thus be seen that as the machine is pulled forwardly counterclockwise rotation of main drive sprocket 55 is translated by drive chain 56 to clockwise rotation of axle sprocket 66 and counterclockwise rotation of axle sprocket 65, resulting in clockwise rotation of drive roller 61 and counterclockwise rotation of roller 62. Thus, cable inserted between rollers 61 and 62 is fed downwardly through cable tube 41 by this counterrotation of rollers 61 and 62.

Appropriate adjusting means are provided on the outer, forward extremities of plates 58 and 59 to adjust the clearance between force feed rollers 61 and 62 to vary the pressure exerted by rollers 61 and 62 against cable passing downwardly therebetween and to accommodate cable of varying diameters. These adjusting means comprise set screws 67 and 68 which are screw-threaded about their outer peripheries and engage internally screw-threaded studs 69 and 70, welded or otherwise affixed to the outer, forward surfaces of plates 58 and 59, in horizontal alignment with the outer extremities of axle 64 of feed roller 61. The bores for axle 64 in plates 58 and 59 are preferably longitudinally extended at 71 and 72 to provide adjusting space for axle 64 when adjusting screws 67 and 68 are appropriately turned in studs 69 and 70. Cylindrical sleeves may be provided pivotally affixed at the rearward extremities of bolts 67 and 68, fitting over the outer extremities of axle 64, to provide positive adjusting engagement between the rear extremities of bolts 67 and 68 and the outer extremities of axle 64. Thus, clockwise rotation of bolts 67 and 68 will force axle 64 and force feed roller 61 rearwardly toward feed roller 62. Counter-clockwise rotation thereof will move roller 61 forwardly between plates 58 and 59, away from roller 62, thus increasing the space between roller 61 and roller 62.

By the provision of this sprocket, drive chain and roller combination a positive force feed is provided for the cable which is passed downwardly between counter-rotating feed rollers 61 and 62 into entry neck 44 of cable tube 41. The cable is pulled downwardly between rollers 61 and 62 and forced downwardly thereby through cable tube 41 and out at its curved lower extremity 42 into the bottom of the cut made by ditching blade 28 and plow 39. Rollers 61 and 62 are preferably formed of a resilient material such as rubber, or other suitable material.

A further function of feed rollers 61 and 62 is to force a small percentage of slack in the cable fed to the cable tube and into the cut, to allow for expansion and contraction of the cable in the cut, after it is laid.

This force feed mechanism may be applied to any size cable layer or installation and may be adjusted in size to handle the smallest cable or wires and also larger diameter cables and distribution lines. The feed rollers may be provided with overrunning clutches which will power them in one direction only. The provision of such overrunning clutches on the feed rollers will allow the cable or wire to pass between the rollers freely if the power drive wheel slips in mud or water or if it raises above the ground.

The feed rollers may be powered by the traction wheels or by individual motor power.

Further, a counter or meter, marked in lineal units, may be associated with the drive to measure the length of cable passed between the rollers, if desired.

By varying the size of the main drive sprocket 55 and the size of the drive sprockets 65 and 66 for the rollers the amount of cable passed between the feed rollers may be varied, as desired. Normally, ⅛″ of extra cable should be laid for every foot of travel, or approximately 12.5″ of extra cable per 100 feet. This excess will more than take care of normal requirements of contraction and expansion in the cable. Where requirements call for more slack in the cable the diameter of the sprockets may be appropriately varied to take care of such extra cable.

In the present installation, which is comparatively light and of small size, the wheels 17 and 18 are preferably 12″ in diameter, the main drive sprocket 55 is 9″ in diameter, the drive sprockets 65 and 66 are 1½″ in diameter and the feed rollers 61 and 62 are 2¾″ in diameter. This installation will provide a feed of approximately 12.5″ of extra cable per 100 feet of cable laid. This excess will take care of most contingencies, but where it is desired to lay a further excess of cable an appropriate increase in diameter of main drive sprocket 55 or a proportional decrease in the diameters of force feed roller sprockets 65 and 66 may be made to accomplish such a proportional increase in slack laid.

Where it is not desired to utilize a force feed, the entire force feed mechanism may be eliminated and the feed may be a direct one to entry neck 44 of cable tube 41, depending solely upon the forward movement of the machine to pull the cable downwardly through cable tube 41 and lay it in the bottom of the cut formed by the blade 28.

The size and dimensions of all elements of the force feed mechanism may be varied at will to accommodate installations of any size and cable of widely varying diameters.

The manner of operation of the machine is as follows: An initial cut is made in the ground to receive blade 28 to the proper depth, at the initial point from which the cable is to be laid. The cable is then passed downwardly between rollers 61 and 62, through cable tube neck 44 and cable tube 41 and its terminal end is pulled out of the curved extremity 42 of cable tube 41. Coulter blade 24 is set into the surface of the ground, forward wheels 17 and 18 being in proper contact with the ground. Traction is then applied to traction hitch 14 and the machine is pulled forwardly, blade 28 making a cut of the desired depth in the surface of the ground, cable C being fed through cable tube 41 by force feed rollers 61 and 62 and being laid in the bottom of the cut formed by blade 28. The operator may apply his weight downwardly on step 54 and against arms 46 and 47, as required, to maintain blade 28 at proper depth in the ground. The operator may "ride" on step 54 and arms 46 and 47, if required. Any length of cable desired may be laid in this manner. After the required length of cable is laid, the machine is stopped, the cable is cut and the operation is complete.

As previously stated, the length of blade 28 may be adjusted below frame 10 by means of bolts 34 and 35 and the paired holes 30 and 31 in the head 29 of blade 28. Blade 28 may be of any required length and dimensions, depending upon the depth of cut desired. In the unit herein illustrated the overall weight of the machine is about 125 lbs. and blade length may be varied between 15″ and 18″, depending upon which set of holes 30 or 31 in the blade head 29 is utilized.

This specification is by way of illustration of one embodiment of the invention. Attention is directed to the appended claims for a limitation of the scope of the invention.

What is claimed is:

1. In a ditching and cable laying machine, a main frame, a hitching eye disposed at one side of the forward extremity of said frame, an axle mounted across the forward upper extremity of said frame rearwardly of said hitching eye, wheels rotatably mounted on the extremities of said axle equally spaced on each side of said main frame and extending downwardly to a point just below the lower surface of said main frame, a coulter wheel rotatably mounted on one side of said main frame rearwardly of said wheels and extending downwardly beneath said frame to a distance greater than the lowest point of said wheels, a ditching blade affixed to said main frame rearwardly of said coulter wheel and aligned in the same vertical plane therewith, a sharpened forward edge on said blade, a curved toe disposed at the lower forward extremity thereof, a cable tube disposed downwardly along the rear edge of said blade, a flexible entry neck affixed to the upper extremity of said cable tube, parallel plates extending upwardly from the rear extremity of said frame above said blade, axles rotatably mounted through said plates and extending outwardly therefrom, feed rollers mounted on said axles between said plates in proximity to each other over said cable tube, aligned sprockets on the extremities of said axles, a main drive sprocket affixed to the interior surface of one of said wheels disposed in the same vertical plane as said axle sprockets, an endless drive chain passed over said main drive sprocket passing under the forward of said axle sprockets and over the rearmost of said axle sprockets, means on said plates to regulate the space between said rollers, a foot rest extending outwardly and rearwardly from the rear upper extremity of said main frame and paired handle means affixed to the rear extremity of said main frame and extending upwardly and outwardly therefrom beyond the rear end of said main frame.

2. In a ditching and cable laying machine, a main frame, upwardly angled at its lower forward extremity, a hitching eye disposed at one side of the forward extremity of said frame, an axle mounted across the forward upper extremity of said frame rearwardly of said hitching eye, wheels rotatably mounted on the extremities of said axle equally spaced on each side of said main frame and extending downwardly to a point just below the lower surface of said main frame, a coulter wheel rotatably mounted on one side of said main frame rearwardly of said wheels and extending downwardly beneath said frame to a distance greater than the lowest point of said wheels, a ditching blade affixed to said main frame rearwardly of said coulter wheel and aligned in the same vertical plane therewith, a sharpened forward edge on said blade, a curved toe disposed at the lower forward extremity thereof, a cable tube disposed downwardly along the rear edge of said blade, a flexible entry neck affixed to the upper extremity of said cable tube, parallel plates extending upwardly from the rear extremity of said frame above said blade, axles rotatably mounted through said plates and extending outwardly therefrom, feed rollers mounted on said axles between said plates in proximity to each other over said cable tube, aligned sprockets on the extremities of said axles, a main drive sprocket affixed to the interior surface of one of said wheels disposed in the same vertical plane as said axle sprockets, an endless drive chain passed over said main drive sprocket passing under the forward of said axle sprockets and over the rearmost of said axle sprockets, means on said plates to regulate the space between said rollers, a foot rest extending outwardly and rearwardly from the rear upper extremity of said main frame and paired handle means affixed to the rear extremity of said main frame and extending upwardly and outwardly therefrom beyond the rear end of said main frame.

3. In a ditching and cable laying machine, a main frame, a hitching eye disposed at one side of the forward extremity of said frame, an axle mounted across the forward upper extremity of said frame rearwardly of said hitching eye, wheels rotatably mounted on the extremities of said axle equally spaced on each side of said main frame and extending downwardly to a point just below the lower surface of said main frame, a coulter wheel rotatably mounted on one side of said main frame rearwardly of said wheels and extending downwardly beneath said frame to a distance greater than the lowest point of said wheels, a ditching blade affixed to said main frame rearwardly of said coulter wheel and aligned in the same vertical plane therewith, a sharpened forward edge on said blade, a cable tube disposed downwardly along the rear edge of said blade, parallel plates extending upwardly from the rear extremity of said frame above said blade, axles rotatably mounted through said plates and extending outwardly therefrom, feed rollers mounted on said axles between said plates in proximity to each other over said cable tube, aligned sprockets on the extremities of said axles, a main drive sprocket affixed to the interior surface of one of said wheels disposed in the same vertical plane as said axle sprockets, an endless drive chain passed over said main drive sprocket passing under the forward of said axle sprockets and over the rearmost of said axle sprockets, means on said plates to regulate the space between said rollers, a foot rest extending outwardly and rearwardly from the rear upper extremity of said main frame and paired handle means affixed to the rear extremity of said main frame and extending upwardly and outwardly therefrom beyond the rear end of said main frame.

4. In a ditching and cable laying machine, a main frame, a hitching eye disposed at one side of the forward extremity of said frame, an axle mounted across the forward upper extremity of said frame rearwardly of said hitching eye, wheels rotatably mounted on the extremities of said axle equally spaced on each side of said main frame and extending downwardly to a point just below the lower surface of said main frame, a coulter wheel rotatably mounted on one side of said main frame rearwardly of said wheels and extending downwardly beneath said frame to a distance greater than the lowest point of said wheels, a ditching blade affixed to said main frame rearwardly of said coulter wheel and aligned in the same vertical plane therewith, a sharpened forward edge on said blade, a curved toe disposed at the lower forward extremity thereof, a cable tube disposed downwardly along the rear edge of said blade, a flexible entry neck affixed to the upper extremity of said cable tube, parallel plates extending upwardly from the rear extremity of said frame above said blade, axles rotatably mounted through said plates and extending outwardly therefrom, resilient feed rollers mounted on said axles between said plates in proximity to each other over said cable tube, horizontally aligned sprockets on the extremities of said axles, a main drive sprocket affixed to the interior surface of one of said wheels disposed in the same vertical plane as said axle sprockets, an endless drive chain passed over said main drive sprocket passing under the forward of said axle sprockets and over the rearmost of said axle sprockets, means on said plates to regulate the space between said rollers, a foot rest extending outwardly and rearwardly from the rear upper extremity of said main frame and paired handle means affixed to the rear extremity of said main frame and extending upwardly and outwardly therefrom beyond the rear end of said main frame.

References Cited in the file of this patent

UNITED STATES PATENTS

| | | |
|---|---|---|
| 1,174,271 | Perry | Mar. 17, 1916 |
| 2,219,682 | Doble | Oct. 29, 1940 |
| 2,699,736 | Sticelber | Jan. 18, 1955 |
| 2,900,931 | Lisle | Aug. 25, 1959 |

FOREIGN PATENTS

| | | |
|---|---|---|
| 283,035 | Great Britain | Jan. 5, 1928 |
| 674,669 | France | Oct. 22, 1929 |
| 937,655 | Germany | Jan. 12, 1956 |
| 1,156,475 | France | Dec. 16, 1957 |
| 1,188,363 | France | Mar. 9, 1959 |